United States Patent [19]
Ruszkowski, Jr.

[11] Patent Number: 5,717,397
[45] Date of Patent: Feb. 10, 1998

[54] LOW OBSERVABLE SHAPE CONVERSION FOR AIRCRAFT WEAPONRY

[75] Inventor: Robert A. Ruszkowski, Jr., Fort Worth, Tex.

[73] Assignee: Lockheed Martin Corporation, Fort Worth, Tex.

[21] Appl. No.: 649,213

[22] Filed: May 17, 1996

[51] Int. Cl.⁶ .................................. H01Q 17/00; B64D 7/00
[52] U.S. Cl. .................................................................. 342/2
[58] Field of Search .............................. 342/1, 2, 3, 4, 342/5; 244/121

[56] References Cited

U.S. PATENT DOCUMENTS

| | | |
|---|---|---|
| 3,997,899 | 12/1976 | Rolsma ........................... 342/3 |
| 4,947,174 | 8/1990 | Lehman et al. ................... 342/3 |

Primary Examiner—Daniel T. Pihulic
Attorney, Agent, or Firm—Arthur F. Zobal

[57] ABSTRACT

An apparatus for encapsulating a warhead or bomb for the purpose of reducing the weapon's radar cross-section, including a hollow jacket and a hollow tail section. The warhead is inserted into the specially-shaped jacket and into at least part of the tail section. The jacket is secured to the warhead by lugs and the tail section is secured to the jacket or to the warhead. The jacket has two pointed seams on opposite sides of a vertical plane passing through the warhead pointing outward from the vertical plane and which extend along the length of the jacket. The front of the tail section has a serrated edge which overlaps the rear end of the jacket. The tail section has horizontal fins and downward and outward extending fins. The lugs allow the apparatus to be releaseably attached to the bottom the fuselage or the bottom of a wing pylon of a military aircraft.

14 Claims, 12 Drawing Sheets

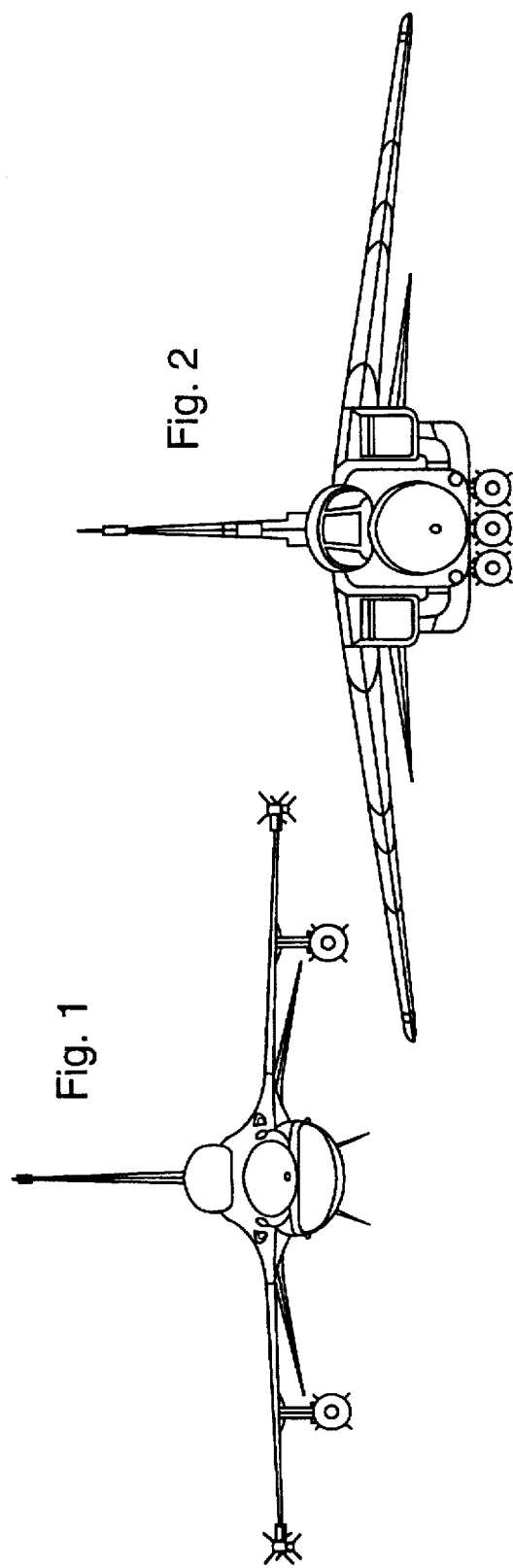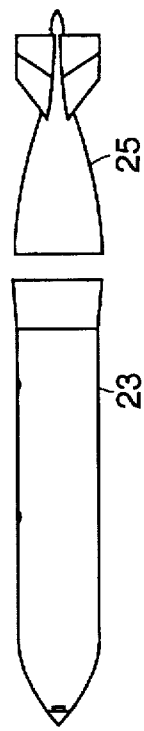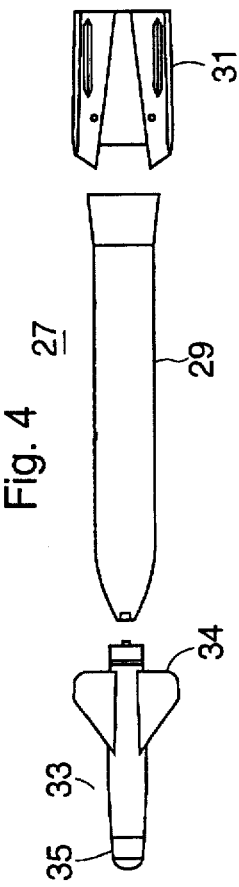

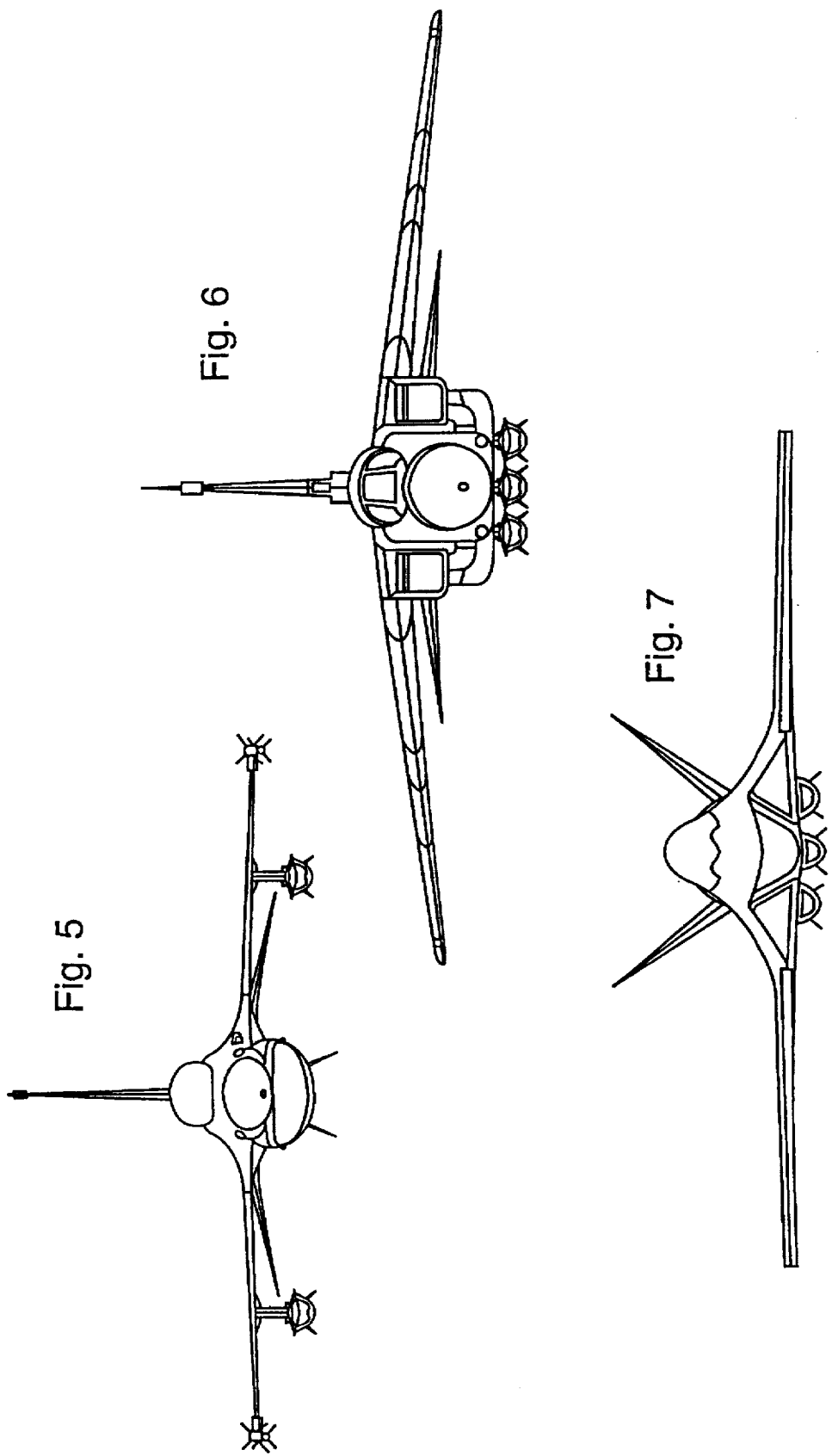

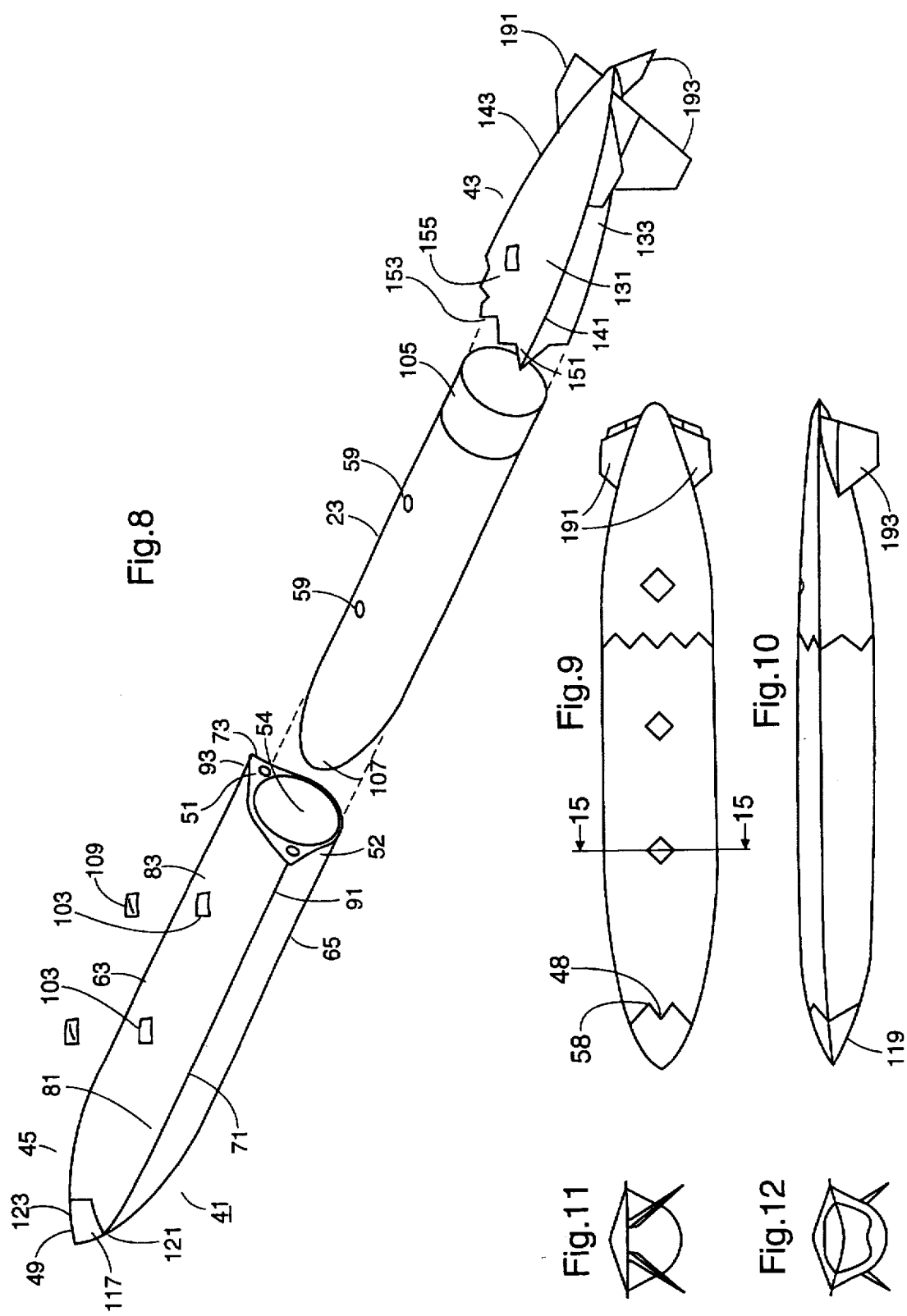

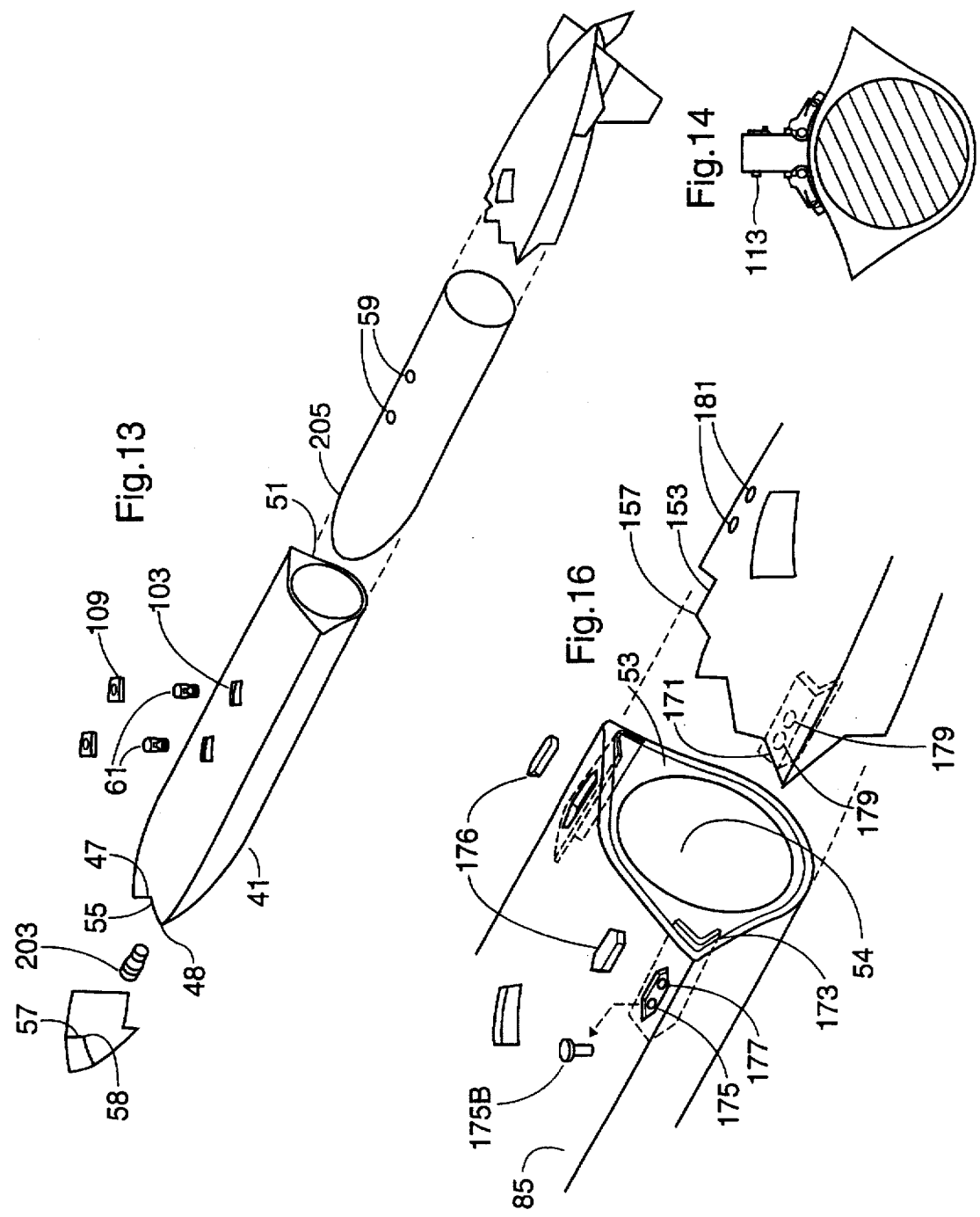

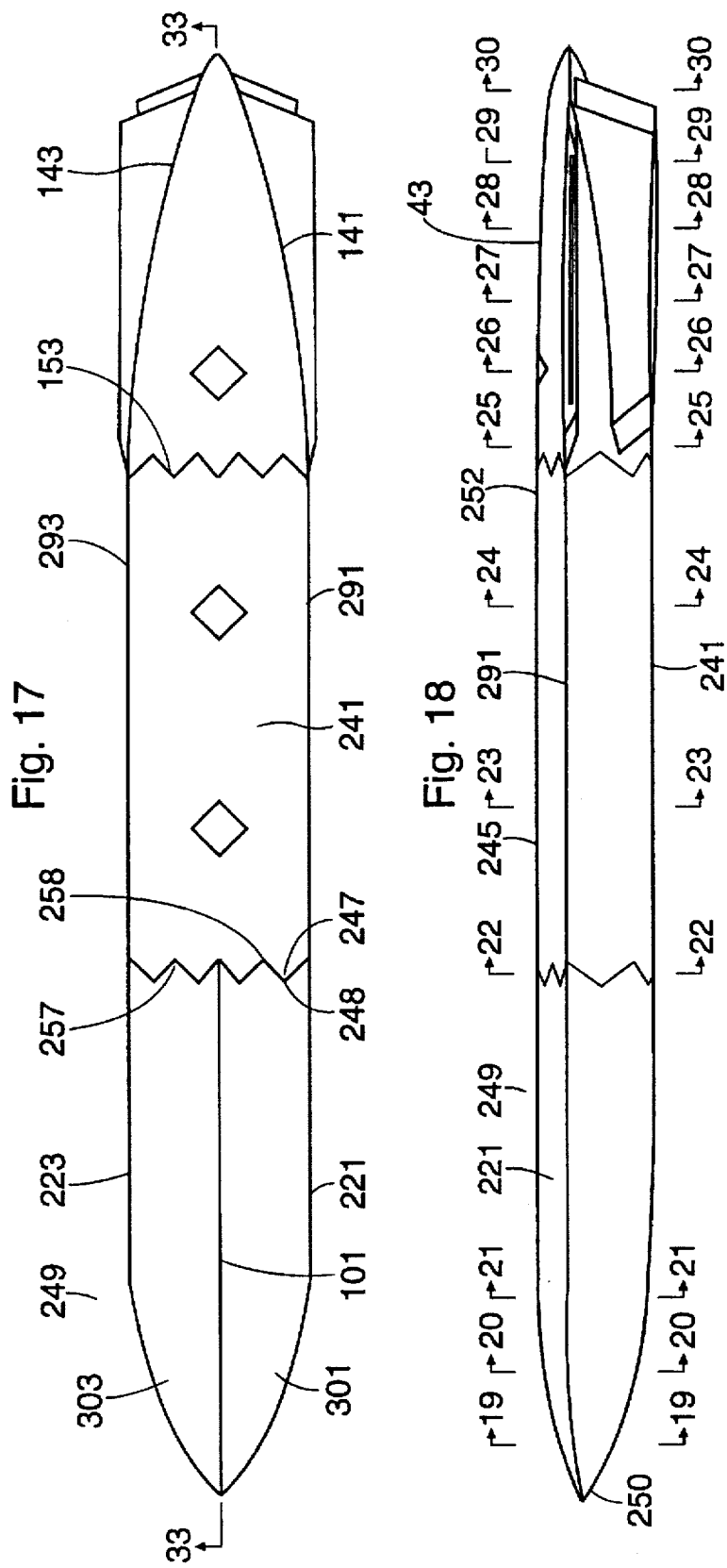

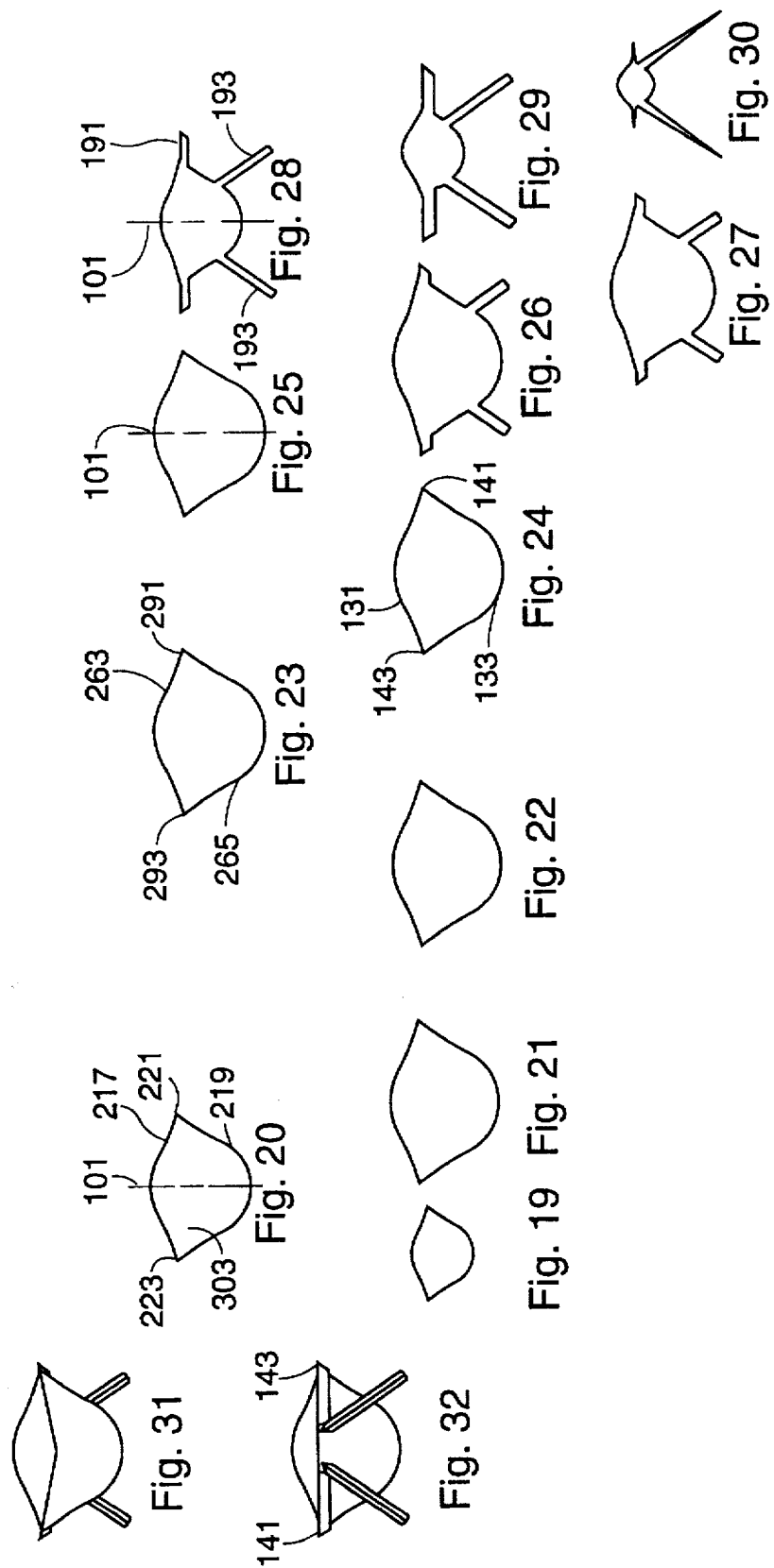

LOW OBSERVABLE SHAPE CONVERSION FOR AIRCRAFT WEAPONRY

BACKGROUND OF THE INVENTION

1. Field of the Invention

The invention relates to the reduction of the radar signature of devices externally mounted to an aircraft.

2. Description of the Prior Art

Radar technology is a fundamental component of the ability for a modern military to detect the position, movement, and intent of enemy aircraft, and to employ weaponry (missiles, guns, interceptor aircraft) to destroy or deter those enemy aircraft. The relative ease or difficulty with which an aircraft is detected by radar is dependent upon its radar signature. The radar signature of an aircraft is basically a measure of how much radar energy is reflected back or "returned" by a target aircraft to a radar system that may be searching for it. The higher or "larger" the radar signature, the easier it is for a radar system/operator to detect, track and potentially direct weapon systems against that aircraft. Radar signature is sometimes referred to as "radar cross-section".

It is widely recognized that there is a direct relationship between aircraft radar signature/detectability and the probability/frequency that the aircraft will encounter, or be engaged by, defensive missiles, guns, or interceptor aircraft. Simply put, the higher the radar signature of an aircraft, the more likely it is that it will be located, shot at or shot down, or will be deterred from attacking its intended target(s). The measure of these probabilities is fundamental to estimating an aircraft's "survivability" or mission effectiveness. Thus, it is beneficial to design military aircraft for low radar signature, or to modify existing aircraft to achieve this same purpose. Low radar signature or cross-section characteristics are often called "low observable".

Designing an aircraft or developing modifications for existing aircraft to achieve low(er) radar signature is a complex problem. However, it is now common knowledge that, in general, lower aircraft radar cross-section can be achieved by a combination of the following:

1. Shaping the exterior of the aircraft or external features, including leading/trailing edges, gaps, and seams, such that radar energy is reflected away from potential enemy radars.

2. Aligning leading and trailing edges, gaps and seams at a minimum number of similar angles (especially in the top or "plan" view of the aircraft), such that the radar returns from these various features are concentrated into fewer angles or sectors.

3. Concealing or hiding highly radar reflective aircraft components from the "view" of potential enemy radars.

4. Utilizing materials and coatings in the construction of aircraft components that absorb or diffuse radar energy.

The radar signature/detectability of an aircraft can vary greatly depending upon the direction from which it is "viewed" by a radar system. It is generally believed that reduced aircraft radar cross-section is most important when the aircraft is viewed by enemy radar(s) from in front, or in the "frontal sector". Additionally, the radar signature of an aircraft can be greatly affected (usually adversely) by the type of "stores" (fuel tanks, bombs, missiles, electronics pods, etc.) that may be carried or mounted externally on an aircraft. Most existing military aircraft types carry stores externally. Those stores are typically mounted on pylons or against the body of the aircraft.

The addition to external stores can significantly increase the radar signature of an aircraft. Most existing aircraft stores were designed without regard to radar signature concerns. Thus, their addition to an aircraft (being mounted on pylons or against the body) can negate any low radar signature features or improvements of the basic aircraft. Alternatively, some recently developed military aircraft (F-117, F-22, B-2) have been designed to carry a specified number of existing ("inventory") weapons internal to their basic airframes. These aircraft are designed with weapon "bays" that are covered by doors to totally conceal the weapons from the view of radar(s). Thus, the weapons do not contribute to the overall radar cross-section of the aircraft in any radar viewing angle. Though providing a direct approach to minimizing the adverse radar signature effects of externally mounted stores, internal weapons carriage causes the aircraft to be designed much larger in size than it would be otherwise. A larger aircraft usually translates into higher aircraft weight, drag, and ultimately, cost.

Development of new weapons that are designed, from the outset, to be mounted externally on a military aircraft without significantly increasing the radar signature of that aircraft is relatively expensive. Additionally, there are large inventories of existing weaponry that have been purchased by the U.S. military, and an all-new weapon would not necessarily utilize those weapon components.

Fighter and attack aircraft utilize a variety of weapons in combat. Among the most numerous in U.S. military inventories are "conventional" explosive bombs (ie. non-nuclear). These bombs are typically stored in a disassembled state as separate components. The explosive portion of a bomb (conventional or nuclear) is commonly referred to as the "warhead". A conventional bomb warhead, sometimes termed a "unitary" warhead, comprises the majority of a bomb's total weight. U.S. unitary warheads are typically in the 500, 1000, or 2000 pound category or "class". A unitary bomb warhead has a characteristic ballistic shape and a circular cross-section, not unlike an artillery shell.

Most conventional bombs are "built-up" by adding components to a warhead such as fins. These components vary in form and function depending upon the intended use for the bomb. The majority of bombs are unguided once released from an aircraft. An aircraft utilizing these types of bombs relies on computed or estimate ballistic trajectories in order to hit a target. These types of weapons are commonly termed "dumb" or "iron" bombs. Other types of bombs are guided to a target somehow in order to improve accuracy. These are often called "smart" bombs. The collection of components added to a warhead in order to build up a specific bomb type is sometimes termed a "kit". In U.S. military weapons inventories, "dumb" bomb kits far outnumber "smart" bomb kits, due mainly to cost differences.

Most inventory bomb types, whether "smart" or "dumb", are highly radar reflective, and remain so when carried or mounted externally on a combat aircraft. Their circular cross-section warheads reflect radar energy in all directions. The fins of a bomb typically reflect radar energy off of one another in such a way that their contribution to the radar signature is spread over a wide range of viewing angles. The gaps and seams between bomb components are not designed to reflect radar energy away from searching radars, nor are they sealed so as to appear "non-existent" to radar energy. Additionally, the exterior surfaces of inventory bombs typically have no material treatment to absorb or diffuse radar energy. In short, the radar signature of one bomb can be as much or more than an entire, "low observable" aircraft from most radar viewing angles.

SUMMARY OF THE INVENTION

It is the purpose of this invention to provide an apparatus and method for the relatively low cost conversion of existing, inventory bomb warheads into a "form" that existing and future military aircraft can carry on pylons or against the body, without a significant increase in radar signature, especially when viewed from the front or frontal sector.

The invention is used to encapsulate an existing, inventory bomb warhead, with minimum modification, within a specially shaped and constructed apparatus which comprises a "jacket" and a tail section. This encapsulating apparatus becomes an integral part of the weapon, and provide the desired low radar signature qualities. Additionally, the apparatus components (kit) provide the aerodynamic characteristics required for the weapon to achieve the desired delivery accuracy.

The overall configuration of the encapsulating components is designed to reflect radar energy away from potential enemy radars, especially those in the frontal sector. The seams between apparatus components are aligned, in plan view, with other external features such as fin leading and trailing edges. The warhead fuze mechanism (if located in the nose) is concealed from view within a removable access cover. Additionally, the entire exterior of the weapon apparatus may be coated with some type of radar absorbent material (RAM) which in one embodiment may comprises a hard rubber-like material that is impregnated with spherically-shaped ferrite particles. The ferrite particles scatter radar energy within the rubber-like substrate where it is absorbed and diffused via simple electrical resistive phenomenon.

The apparatus components may be shaped in many different ways in order to achieve the desired low signature characteristics. However, these components are formed so as to minimize increases in size, surface area, volume, and weight as compared to an inventory bomb. Each size/type of bomb warhead would have a unique shape conversion kit. Provisions could be made for moveable control fins and associated electronics for improved delivery accuracy over a basic unguided version. Another novel feature of the invention is the utilization of the warhead itself for the majority of the weapon's structural integrity. This allows for, relatively, thin shell walls, which saves weight and minimizes size/volume increases.

In the embodiment disclosed, the encapsulating apparatus comprises a jacket having front and rear ends with a surrounding wall having an upper portion, a lower portion, two opposite side portions, and a cavity extending into the jacket at least from the rear end of the jacket to a position near the front end of the jacket. The warhead is adapted to be located in the cavity at a given position such that the front end of the warhead is near the front end of the jacket, the rear end of the warhead is near the rear end of the jacket and the upper and lower sides of the warhead are near the upper and lower portions of the jacket respectively. Means is provided for securing the jacket to the warhead when the warhead is located in the cavity in the given position. A tail section is adapted to be secured to the rear end of the jacket. The jacket is formed such that a main plane extending between the upper and lower portions of the jacket and between the front and rear ends of the jacket, bisects the jacket into two sections. The surrounding wall of the jacket has two pointed seams on opposite sides of the main plane pointing outward from the main plane and which extend along the length of the jacket between the front and rear ends of the jacket. In each of a plurality of planes between the front and rear ends of the jacket and transverse to the main plane, the jacket has a maximum height and maximum width. In each of the plurality of planes, the two seams define the maximum width of the jacket.

In a further aspect, the tail section comprises front and rear ends with a surrounding wall having an upper portion, a lower portion, two opposite side portion and a cavity extending into the tail section at least from the front end of the tail section to a position near the rear end of the tail section. The front end of the surrounding wall of the tail section is adapted to be secured to the rear end of said surrounding wall of the jacket.

In another aspect, fins are connected to the surrounding wall of the tail section at positions such that they do not impede attachment of the apparatus to the bottom of an aircraft.

The front end of the surrounding wall of the tail section preferably is serrated and adapted to overlap the rear end of the surrounding wall of the jacket when secured thereto.

BRIEF DESCRIPTION OF THE DRAWINGS

FIGS. 1 and 2 are from views of military aircraft carrying conventional weapons (bomb).

FIG. 3 is an exploded side view of a conventional 2000 lb. unguided "dumb" bomb identified as USAF BLU-109.

FIG. 4 is an exploded side view of a conventional 2000 lb. laser-guided, "smart" bomb identified as USAF GBU-27/b. The warhead of the bomb of FIG. 4 may be the same as that of FIG. 3.

FIGS. 5, 6, and 7 are front views of military aircraft carrying bombs employing the encapsulating apparatus of the invention. FIG. 7 depicts a proposed aircraft.

FIG. 8 is an exploded isometric view of one embodiment of the apparatus of the invention used to encapsulate the warhead of FIGS. 3 or 4.

FIG. 9 is a top plan view of the assembled apparatus of FIG. 8 encapsulating the warhead of FIG. 8.

FIG. 10 is a side view of the apparatus of FIG. 9.

FIG. 11 is a rear view of the apparatus of FIG. 9.

FIG. 12 is a front view of the apparatus of FIG. 9.

FIG. 13 is an exploded isometric view of the apparatus of FIGS. 8–12 for use for encapsulating another type of warhead.

FIG. 14 is a cross-section of FIG. 9 showing a bomb rack unit.

FIG. 16 illustrates a connecting mechanism for connecting the front of the tail section to the rear of the jacket.

FIG. 17 is a top plan view of a special modification of the encapsulating apparatus of FIG. 4.

FIG. 18 is a side view of the apparatus of FIG. 17.

FIGS. 19–30 are cross-sectional views of FIGS. 18 taken along the lines 19—19, 20—20, 21—21, 22—22, 23—23, 24—24, 25—25, 26—26, 27—27, 28—28, 29—28, and 30—30 thereof showing only the outline of the exterior of the encapsulating apparatus.

FIG. 31 is a front view of the apparatus of FIG. 15.

FIG. 32 is a rear view of the apparatus of FIG. 15.

DESCRIPTION OF THE PREFERRED EMBODIMENT

Figure 15:
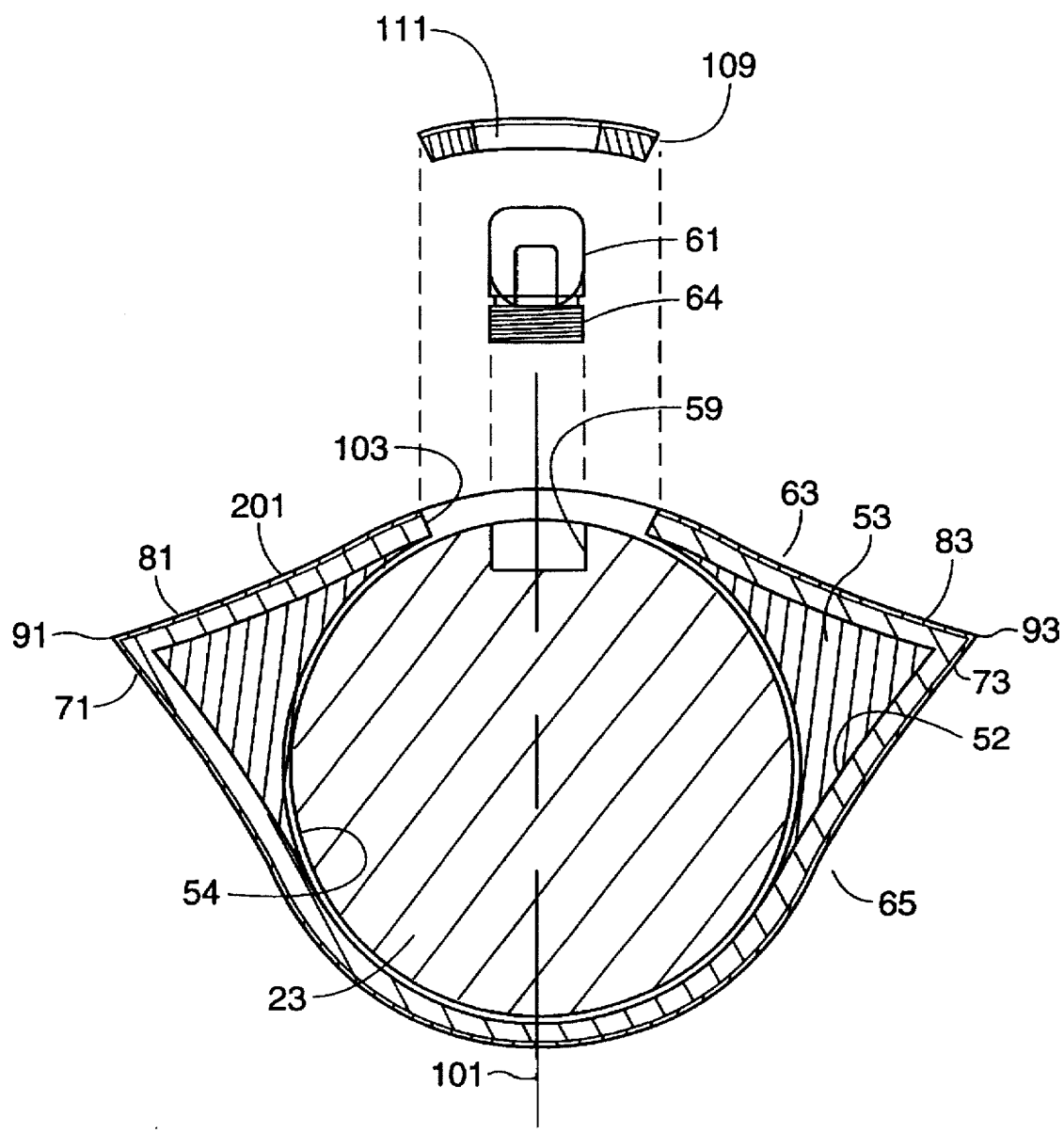
FIG. 15 is an enlarged exploded cross-sectional view of FIG. 9 taken along the lines 15—15 thereof showing a bomb lug and more details of the jackets encapsulating apparatus.

FIGS. 1 and 2 are from views of military aircraft showing bombs mounted to the underside of the wings by pylons and to the underside of the body of the aircraft. The bombs may be unguided "dumb" bombs as shown at 21 in FIG. 3 or laser-guided "smart" bombs as shown at 27 FIG. 4. The bomb 21 of FIG. 3 comprises a warhead 23 a tail section 25 with fins. The front end of the tail section is coupled to the rear of the warhead when assembled. The bomb 27 of FIG. 4 comprises a warhead 29, a tail section 31 with extendable (spring loaded) wings and a forward guidance and control section 33 having a laser seeker 35 and movable control fins 37. When assembled, the tail section is attached to the rear of the warhead and the rear of the guidance and control section is attached to the front of the warhead. The warheads 23 and 29 may be the same. The upper sides of the warheads 23 and 29 are releasably attached to the wing mounted pylons or the underside of the fuselage of the aircraft by way of lug fittings and an airframe/pylon-mounted release mechanism (bomb rack unit). The warheads of both bombs are round in cross-section and the fins and or wings of both bombs define an X or cross when viewed from the fronts of the bombs. This typically increases the radar signature of an aircraft that is carrying the bomb.

FIGS. 5, 6, and 7, show the front views of bombs having their radar signatures reduced in accordance with the invention, releasably mounted to the underside of wing pylons and to the underside of the fuselage of aircraft. In FIG. 7, the bombs are mounted to the underside of the fuselage in a semi-submerged manner. Referring now to FIGS. 8–13 and 15 there will be described one embodiment of the apparatus of the invention. The warhead 23 is shown. The tail section of FIG. 3 is not used. The apparatus comprises a hollow shaped jacket 41 and a hollow tail section 43. The jacket 41 has a front end 45 with a front serrated edge 47 and a removable nose cover 49, a flat rear end 51 and an aperture 54 extending through the jacket 41 from the rear end 51 to a front opening. Filler structure such as foam 53 is inserted into the aperture to define a central aperture 54. The aperture 54 is circular in cross-section with the inside diameter decreasing toward the front end 45 for snugly receiving the warhead 23. The nose cover 49 is used to allow concealment of a bomb fuse mechanism to a warhead as will be described with respect to FIG. 13. The rear edge 57 of the nose cover 49 is serrated and mates with and engages the serrated edge 47 of the jacket 41 when the nose cover 49 is secured in place to the front of the jacket 41. The warhead 23 typically has at least two threaded apertures 59 formed into its top wall for receiving threaded lugs 61 used for attaching the warhead to the hooks of a typical bomb rack unit mounted in the underside of the pylons or fuselage of the aircraft.

The outer wall of the jacket 41 comprises a flattened upper wall 63 and a bottom wall 65 which in cross-section forms a V having a rounded bottom. The two sides edges 71 and 73 of the wall 65 and the two side edges 81 and 83 of the wall 63 are joined together to form two pointed seams or "chines" 91 and 93 on opposite sides of a vertical plane 101 and which point outward from the plane 101 and extend along the length of the jacket between the front and rear ends. The two seams define the maximum width of the jacket 41.

The upper wall 63 of the jacket has two lug receiving apertures 103.

When the warhead 23 is inserted into the central aperture 53 of the jacket from the rear end 51 to a nested position, the rear end 105 of the warhead 23 will extend rearward beyond the rear end of the jacket 41 and the front end 107 of the warhead 23 will extend to or forward beyond the front serrated edge 47. In this position, warhead apertures 59 will be aligned with jacket apertures 103. Bomb lug sleeve portions 109 with central apertures 111 may be inserted into jacket apertures 103 against the warhead 23 and the threaded ends 64 of the lugs 61 inserted through the sleeve apertures 111 and screwed into the threaded apertures 59 to secure the jacket 41 and the sleeve portions 109 to the warhead 23. The angles of the serrated seams are aligned (in top/plan view) with those of the tail fin leading edges, thus concentrating their respective radar reflections into one direction.

A standard bomb rack 113 is shown in FIG. 14 attached to the bottoms of the wing pylons or the bottom of the fuselage, releasably hold the upstanding lugs 61 to releasably secure the assembly to the aircraft.

The nose cover 49 is fastened to the jacket 41. As seen in FIGS. 9 and 13, the serrated edge 47 has a plurality of V shaped edges with the points 48 of the V's pointing forward and the serrated edge 57 of the cover has a plurality of V-shaped edges with the points 58 of the V's pointing rearward with adjacent points 48 and 58 being offset from each other such that the serrated edges 57 and 47 mate and engage each other in an end to end relationship when the cover 49 and the jacket 41 are secured together.

The nose cover 49 also has a flattened top 117 and a V-shaped bottom 119 with a rounded bottom and two outward extending seams 121 and 123. When the cover 49 is attached to the jacket 41, the cover walls 117 and 119 form a continuation of the jacket walls 63 and 65 and the cover seams 121 and 123 form a continuation of the jacket seams 91 and 93.

The tails section 43 has a flattened top wall 131 and a bottom wall 133 with two outward extending seams 141 an 143. The tail section 43 has a forward end 151 with a forward serrated edge 153 and an opening 155 extending from the edge 153 rearward into the tail section. Note FIG. 33. The serrated edge 153 comprises a plurality of V-shaped edges with the points 157 of the V's pointing forward.

Figure 34:
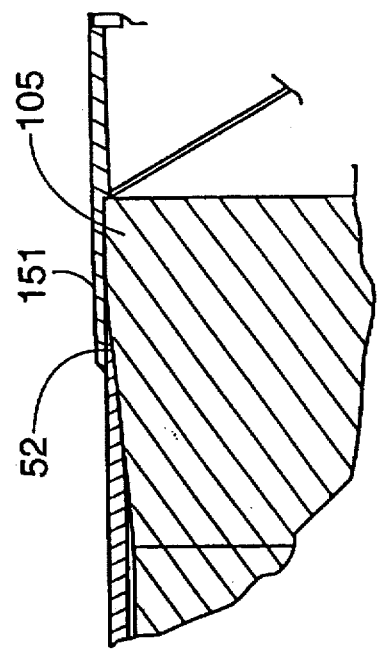
FIG. 34 is an enlarged of a portion of FIG. 33 showing in more detail the overlapping of the front end of the tail section with the rear end of the jacket of the apparatus of the invention.
Figure 33:
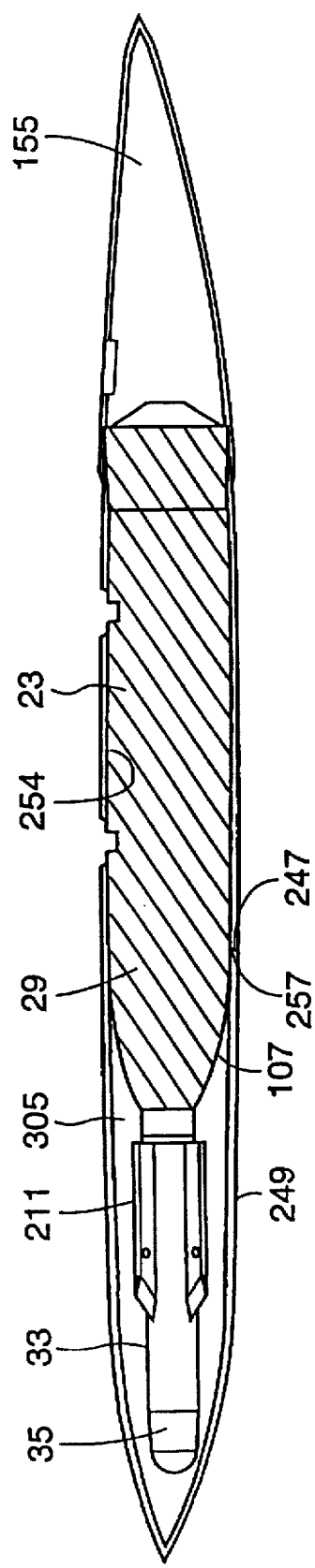
FIG. 33 is a cross-section of FIG. 17 taken along the lines 33—33 thereof showing a "smart" bomb of FIG. 4 therein with its tail removed and with modified front fins.

The opening 155 at the front edge 151 of the tail section 43 has the same shape at that of the outer surface of the rear of the jacket 41 but is larger such that the rear portion 52 of the jacket 41 and the rear end 105 of the warhead 23 will fit into the front of the opening 155 with the serrated edge 153 overlapping the rear end 52 of the jacket 41 as shown in FIGS. 33 and 34. The tail section 43 then is attached to the rear end 52 of the jacket as shown in FIG. 16.

In the embodiment of FIG. 16, angle members 171 (only one of which is shown) and 173 are secured to the insides of the tail section and rear end 52 of the jacket 41. The angle members 173 have threaded apertures 175 which are accessible through apertures 177 formed through the top wall of the jacket 41. The members 171 have threaded apertures 179 which are accessible through aligned apertures 181 formed through the top wall 131 of the tail section 43. The rear end 52 of the jacket 41 is inserted into the opening 155 of the tail section 43 until the apertures 175 are aligned with apertures 181 and 179 and bolts 175B are screwed into threaded the apertures 179 to secure the tail section 43 to the jacket 41. The apertures 177 then are "filled" with plug/covers 176 shown in FIG. 16.

When the tail section 43 is secured to the jacket 41, the jacket seams 91 and 93 are aligned with tail section seams 141 and 143 respectively.

As shown in FIGS. 8–13 the rear of the tail section 43 has two stabilizing fins 191 which outward in a horizontal plane transverse to the vertical plane 101 and two control fins 193 which flare outward and downward relative to the vertical plane 101. The stabilizing and control fins do not impede attachment of the apparatus to the bottom of wing pylons or to the bottom of the aircraft fuselage.

The outward extending seams 121, 71, 141 and 123, 91, 93 extend along the length of the apparatus and reflect radar energy away from potential enemy radar and hence reduce the radar cross-section. The stabilizing and control fins also reflect radar energy away from the warhead and do not impede attachment of the warhead to the aircraft. Preferably the exterior of the nose cover, 41, the exterior of the jacket 23 and the exterior of the tail section 43 have a radar absorbent coating 201 as shown in FIG. 15. The serrated edges 48 and 58 and 153 are V-shaped and hence also reflect energy radar away from the apparatus of the invention.

In the embodiment of FIG. 13, the nose cover 49 is used to allow attachment of a bomb fuse mechanism 203 used with certain bombs 205 after the bomb have been inserted in place in the jacket opening 54.

Figure 35:
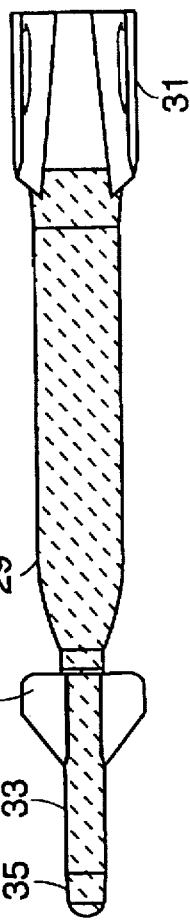
FIG. 35 is a side view of the "smart" bomb of FIG. 30 with its conventional forward fins and tail kit assembled in place. It is identified as USAF GBU-27/b, with shaded portions indicating those components retained for the embodiment shown in FIG. 33.
Figure 36:
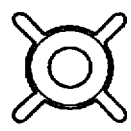
FIG. 36 is a front view of FIG. 35.
Figure 37:
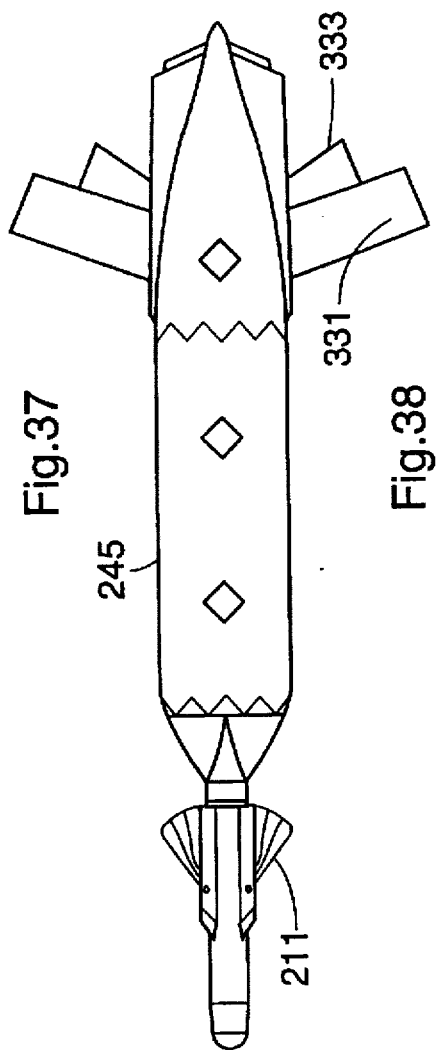
FIG. 37 is a top plan view of the modified bomb of FIG. 35 and the modified encapsulation apparatus of FIGS. 17–18 in the post-drop configuration, with fins 211 exposed and deployed and fins 331 and 333 deployed.
Figure 38:
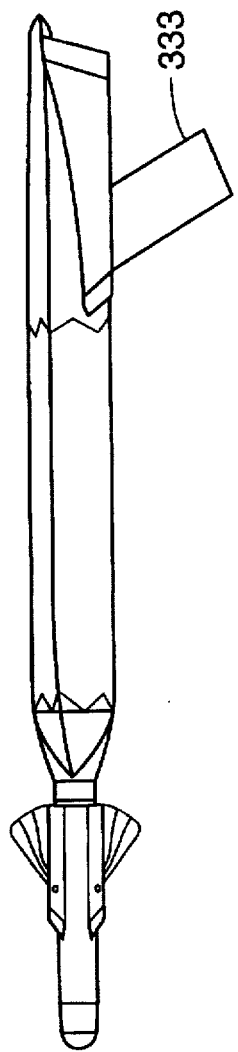
FIG. 38 is a side view of FIG. 37.
Figure 39:
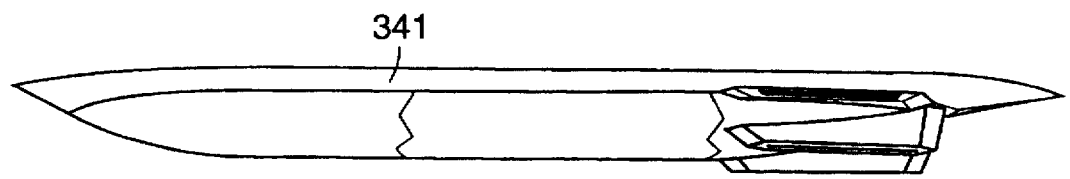
FIG. 39–43 illustrate the drop sequence of the apparatus of FIGS. 17, 18, 37, and 38 showing the spring out of the rear fins; the separation of the apparatus from the aircraft, the break away of the forward portion of the jacket; and the spring out of the forward fins of the bomb.

Referring now to FIGS. 17, 18, and 33–43, there will be described an apparatus for encapsulating a "smart" bomb of FIGS. 4, 35 and 36. The tail 31 of FIGS. 4, 35 and 36 is removed and the forward fins 34 of the guidance and control section 33 are replaced with spring-loaded expandable fins 211 of FIGS. 37, 38, 42, and 43. The jacket comprises jacket 241 and jacket 249. Jacket 241 is secured to the warhead 23 with lugs 61 in the same manner that jacket 41 is secured to the warhead 23. The jacket 241 is the same type as jacket 41 except that it is straight from its front end 245 to its rear end 252 and it has filler material similar to material 53 which has a cylindrical opening or aperture 254 formed therethrough. The jacket 241 has a flattened top wall 263 and a V-shaped bottom wall with a rounded bottom end with two outward extending seams 291 and 293. The rear end 252 of the jacket 241 terminates in a plane transverse to the axis thereof and its front end 245 has a serrated edge 247 which has a plurality of V's with points 248 pointing forward. The warhead 23 is inserted through the opening 254 with its front end 107 extending forward of the serrated edge 247 and its rear end 105 extending rearward of the rear edge 252.

The jacket 249 has a pointed front end 250 and a rear serrated end 257 formed by a plurality of V-shaped edges with points 258 pointing rearward. The jacket 249 has a flattened top wall 217 and a V-shaped bottom wall 219 with a rounded bottom and two outward extending seams 221 an 223. Along the vertical plane 101 the jacket 249 can split to two side sections 301 and 303 when actuated by a suitable explosive means. With the two sides 301 and 303 assembled, an opening or cavity 305 extends into the jacket 249 from the rear edge 157. With the warhead 23 secured in the jacket 241 and its front end extending beyond its serrated edge 247, the guidance and control device 33 with its fins 211 retracted is secured to the front end of the warhead 23 and the guidance and control device 33 and the front end of the warhead 23 are inserted into the cavity 305 from the rear end 257 until the serrated edges 257 and 247 mate with each other as shown in FIGS. 17, 18, and 33. The jacket 249 then is secured to the front of the warhead 23 with bolts that can be explosively released by a radio signal, or timer device.

The tail section 43 is that same as that of FIGS. 8–14 except that it has a different fin arrangement. The tail section 43 has an opening 155 extending into the tail section 43 from its forward end 151. The forward end 151 of the tail section has the serrated edges 153 and is placed around the rear end 105 of the warhead and overlaps the rear end 252 of the jacket 241 and is secured to the rear end of the jacket 241 with the arrangement as disclosed in FIG. 16. The tail section 43 of FIGS. 17–43 has lanyard-deployed fins 331, and lower fins 333 which are deployed at ejection for separation stability and fins 335 which spring out for glide purposes. In the assembled position, the seams 221, 291, 141 and 223, 293, 143 are aligned.

Figure 40:
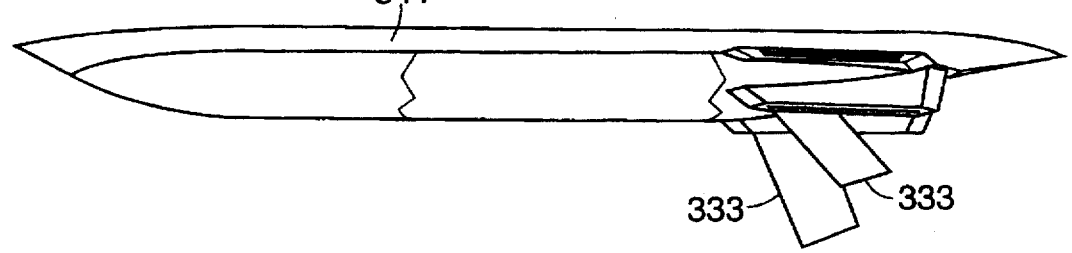
Figure 41:
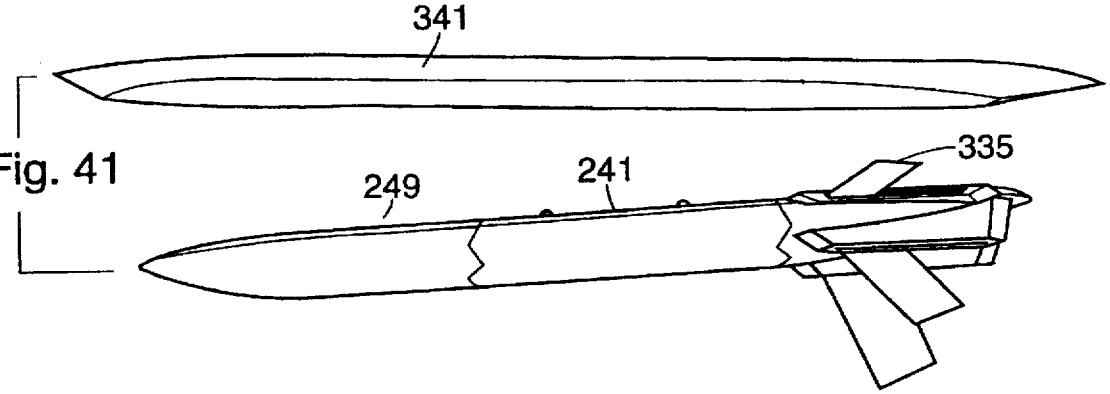
Figure 42:
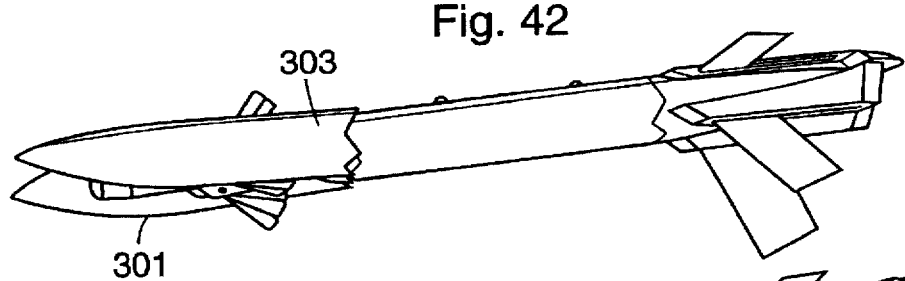
Figure 43:
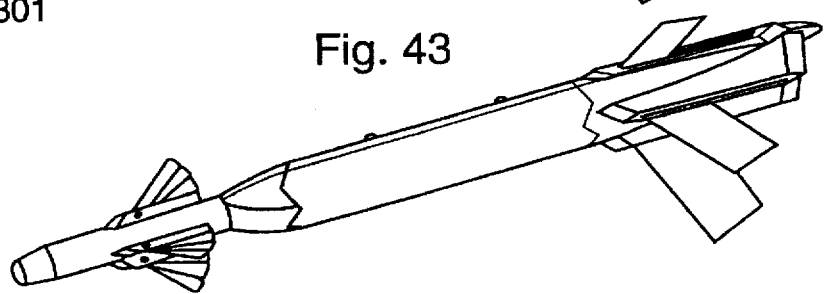
Figure 47:
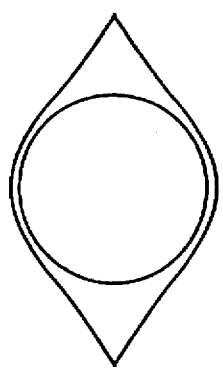
FIGS. 44–51 are cross-sections of different possible configurations of the jacket of the invention.
Figure 46:
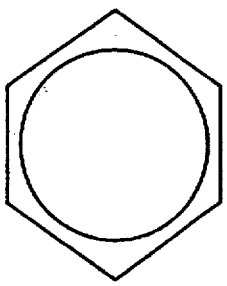
Figure 53:
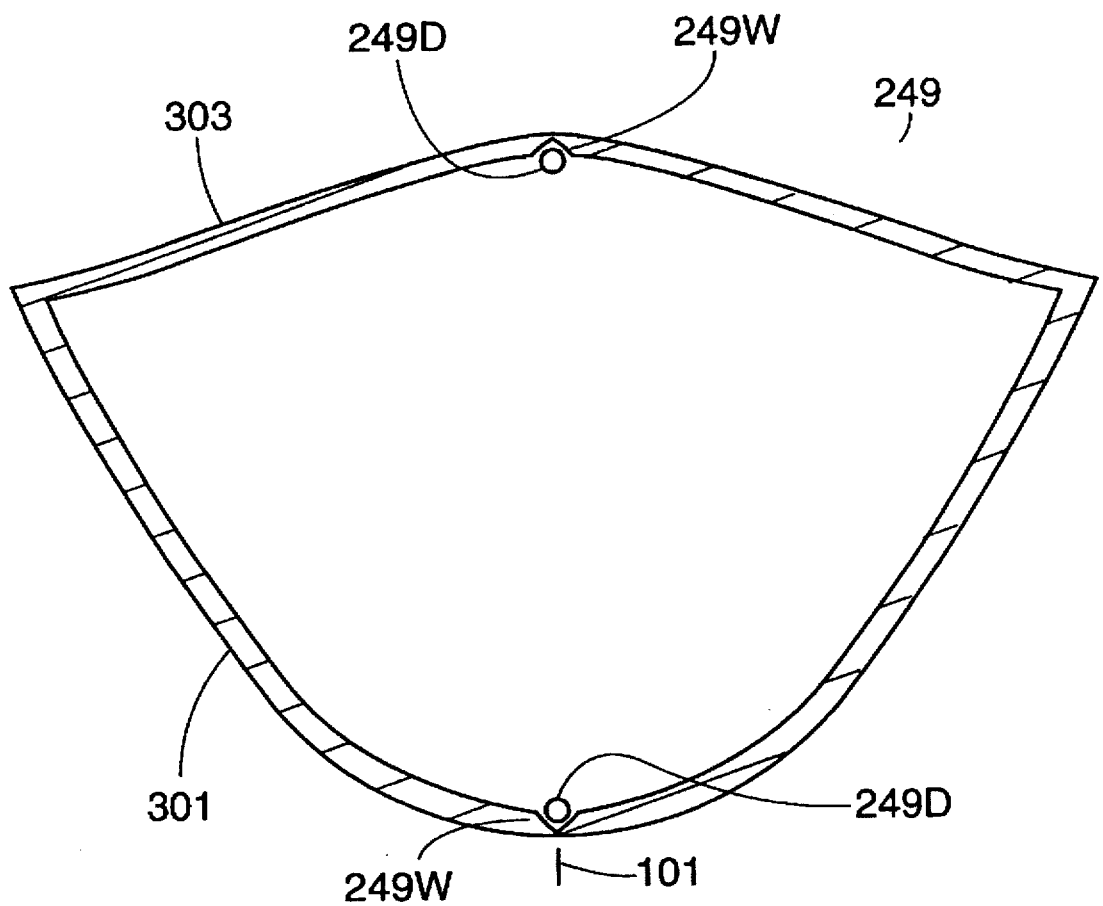
FIG. 53 illustrate weakened seams in one of the from jackets of the invention.
Figure 52:
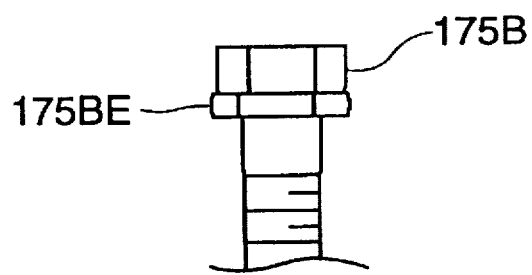
FIG. 52 illustrates an explosively actuated bolt.

FIGS. 39–43 illustrates the assembled apparatus of FIGS. 17–34 and 37–38 attached to a notional cradle fairing 341 that in turn will be attached to the underside of an aircraft fuselage as shown in FIGS. 6 and 7. Referring to FIGS. 39–43, the lugs 61 are used to releaseably attach the top of the apparatus to the bottom side of a bomb rack unit via lug hooks which are inside of cradle 341 secured to the bottom of the fuselage of an aircraft. The two halves 303 and 301 of the break-away jacket 249 may be attached to jacket 241 in a method similar to that of FIG. 16. The bolts 175B used to secure jacket 249 to jacket 241 may be of the explosive type having an explosive charge in a sleeve 175BE (See FIG. 52) with a mechanism for explosive actuation by a radio signal or timer. The jacket 249W may be manufactured as one piece with a wakened seam 249 along plane 101. This seam would be split after weapon release via small explosive charges along the seam such as a detonation primer chord 249D (See FIG. 53). Prior to dropping the weapon, the fins 333 spring out to stabilize the weapon during separation as shown in FIG. 40. Upon release of the weapon from the cradle 341, additional fins 335 spring out for glide purposes as shown in FIG. 41. The forward jacket 249 breaks away 496 from the jacket 201 with the two side sections 301 and 303 separating to expose the device 33. The control fins 211 then spring out as shown in FIGS. 42 and 43 and the bomb is guided to the impact point by radio signal or autonomous guidance.

Figure 45:
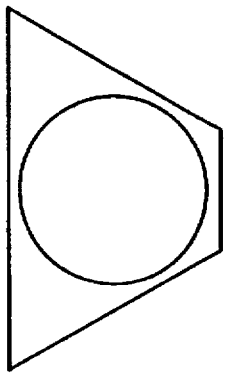
Figure 44:
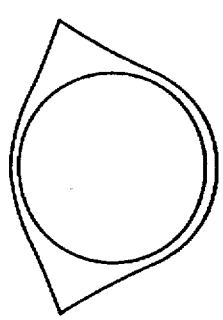
Figure 51:
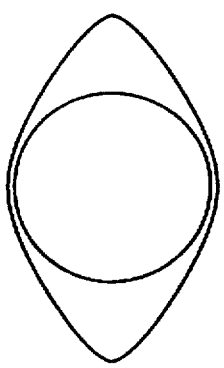
Figure 50:
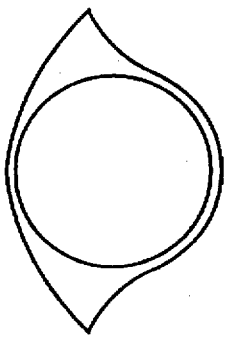
Figure 49:
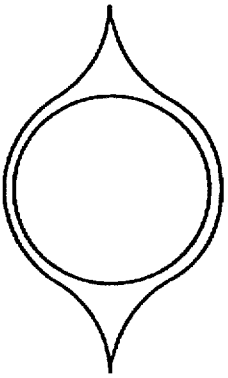
Figure 48:
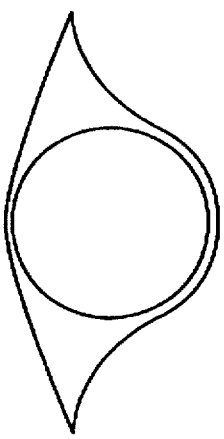

FIG. 45 illustrates the shape of the jacket in cross section of the embodiments of FIGS. 8–44. Other cross-section shapes of the jacket may be used as shown FIGS. 46–52. In all cases the jacket has a top wall and a bottom wall with two pointed seams opposite sides of the vertical plane which point outward and extend along the length of the jacket between the front and rear ends of the jacket. In planes transverse the vertical plane, the two seams define the maximum width of the jacket and reflect radar energy away from the apparatus.

I claim:

1. An apparatus for use for minimizing the reflection of radar energy back to a source from a bomb to be carried by an aircraft in an external position, and wherein said bomb comprises a warhead having a front end, a rear end, and a surrounding wall extending between said front and rear ends and which is generally round in cross section, said surrounding wall having an upper portion, a lower portion, and two opposite side portions, said apparatus comprising:

a jacket having front and rear ends with a surrounding wall having an upper portion, a lower portion, two opposite side portions, and a cavity extending into said jacket at least from said rear end of said jacket to a position near said front end of said jacket, said warhead being adapted to located in said cavity at a given position such that said front end of said warhead is near said front end of said jacket, said rear end of said warhead is near said rear end of said jacket and said upper and lower portions of said warhead are near said upper and lower portions of said jacket respectively, means for securing said jacket to said warhead when said warhead is located in said cavity in said given position, a tail section adapted to be secured to said rear end of said jacket, said jacket being formed such that a main plane extending between said upper and lower portions of said jacket and between said front and rear ends of said jacket, bisects said jacket into two sections, said surrounding wall of said jacket having two pointed seams on opposite sides of said main plane pointing outward from said main plane and which extend along the length of said jacket between said front and rear ends of said jacket, in each of a plurality of planes between said front and rear ends of said jacket and transverse to said main plane, said jacket has a maximum height and maximum width, in each of said plurality of planes, said two seams define the maximum width of said jacket.

2. The apparatus of claim 1, wherein:

said tail section comprises front and rear ends with a surrounding wall having an upper portion, a lower portion, two opposite side portion and a cavity extending into said tail section at least from said front end of said tail section to a position near said rear end of said tail section, said tail section being formed such that a main tail section plane extending between said upper and lower portions of said tail section between said front and rear ends of said tail section bisects said tail section into two sections, said surrounding wall of said tail section having two pointed seams on opposite sides of said main tail section plane and pointing outward from said main tail section plane and which extend along the length of said tail section between said from and rear ends of said tail section, in each of a plurality of tail section planes, between said front and rear ends of said tail section and transverse to said main tail section plane said tail section surrounding wall has a maximum height and a maximum width, in each of said tail section planes, said two tail section seams define the maximum width of said tail section surrounding wall, said front end of said surrounding wall of said tail section is adapted to be coupled to said rear end of said surrounding wall of said jacket such that said two pointed seams of said surrounding wall of said tail section at said front end of said surrounding wall of said tail section are aligned with said two pointed seams of said surrounding wall of said jacket at said rear end of said surrounding wall of said jacket.

3. The apparatus of claim 2, comprising:

fins connected to said surrounding wall of said tail section at positions below said two seams of said surrounding wall of said tail section and which extend outward to positions below said two seams of said surrounding wall of said tail section.

4. The apparatus of claim 2, wherein:

said front end of said surrounding wall of said tail section is serrated and comprises a plurality of spaced apart pointed front portions and a plurality of spaced apart rear portions, with each rear portion being located between and rearward of two adjacent front portions such that each front portion flares rearward to adjacent rear portions, said serrated front end of said tail section is adapted to over lap said rear end of said surrounding wall of said jacket.

5. The apparatus of claim 4, comprising:

fins connected to said surrounding wall of said tail section at positions below said two seams of said surrounding wall of said tail section and which extend outward to positions below said two seams of said surrounding wall of said tail section.

6. The apparatus of claim 1, wherein:

said jacket comprises a forward member and a rear member, said forward member having front and rear ends with a surrounding wall having an upper portion, a lower portion, two opposite side portions, and a forward opening extending into said forward member at least from said rear end of said forward section near said front end of said forward member, said rear member of said jacket having front and rear ends with a surrounding wall having an upper portion, a lower portion, two opposite sides, and a rear opening extending through said rear member between said front and rear ends of said rear member, said front end of said rear member being adapted to be secured to said rear end of said forward member such that said front end of said forward member and said rear end of said rear member form said front and rear ends of said jacket respectively, said forward and rear openings form said cavity, said upper portions of said forward and rear members are aligned to form said upper portion of said jacket said lower portions of said forward and rear members are aligned to form said lower portion of said jacket, and said two sides of said front member are aligned with two sides of said rear member to form said two pointed seams of said surrounding wall of said jacket on opposite sides of said main plane pointing outward from said main plane and which extend along the length of said jacket between said front and rear ends of said jacket, said front end of said surrounding wall of said rear member is serrated and comprises a plurality of spaced apart pointed front portions and a plurality of spaced apart rear portions, with each rear portion being located between and rearward of two adjacent pointed front portions such that each pointed front portion flares rearward to adjacent rear portions, said rear end of said surrounding wall of said forward member is serrated and comprises a plurality of spaced apart pointed rear portions and a plurality of spaced apart front portions, with each front portion being located between and forward of two adjacent pointed rear portions such that each pointed rear portion flares forward to adjacent front portions, said serrated front end of said rear member being formed to mesh with said serrated rear end of said front member when positioned together, and means for securing said front and rear members to said warhead with said serrated front end of said rear member meshing with said serrated rear end of said front member.

7. The apparatus of claim 6, wherein:

said tail section comprises front and rear ends with a surrounding wall having an upper portion, a lower portion, two opposite side portion and a cavity extending into said tail section at least from said front end of said tail section to a position near said rear end of said tail section, said tail section being formed such that a main tail section plane extending between said upper and lower portions of said tail section between said front and rear ends of said tail section bisects said tail section into two sections, said surrounding wall of said tail section having two pointed seams on opposite sides of said main tail section plane and pointing outward from said main tail section plane and which extend along the length of said tail section between said front and rear ends of said tail section, in each of a plurality of tail section planes, between said front and rear ends of said tail section and transverse to said main tail section plane, said tail section surrounding wall has a maximum height and a maximum width, in each of said tail section planes, said two tail section seams define the maximum width of said tail section surrounding wall, said front end of said surrounding wall of said tail section is adapted to be secured to said rear end of said surrounding wall of said jacket such that said two pointed seams of said surrounding wall of said tail section at said front end of said surrounding wall of said tail section are aligned with said two pointed seams of said surrounding wall of said jacket at said rear end of said surrounding wall of said jacket.

8. The apparatus of claim 7, comprising:

fins connected to said surrounding wall of said tail section at positions below said two seams of said surrounding wall of said tail section and which extend outward to positions below said two seams of said surrounding wall of said tail section.

9. The apparatus of claim 7, wherein:

said front end of said surrounding wall of said tail section is serrated and comprises a plurality of spaced apart pointed front portions and a plurality of spaced apart rear portions, with each rear portion being located between and rearward of two adjacent front portions such that each front portion flares rearward to adjacent rear portions, said serrated front end of said tail section is adapted to over lap said rear end of said surrounding wall of said jacket.

10. The apparatus of claim 9, comprising:

fins connected to said surrounding wall of said tail section at positions below said two seams of said surrounding wall of said tail section and which extend outward to positions below said two seams of said surrounding wall of said tail section.

11. An apparatus for use for minimizing the reflection of radar energy back to a source from a bomb to be carried by an aircraft in an external position, comprising:

a warhead having a front end, a rear end, and a surrounding wall extending between said front and rear ends and which is generally round in cross section, said surrounding wall having an upper portion, a lower portion, and two opposite side portions, a jacket having front and rear ends with a surrounding wall having an upper portion, a lower portion, two opposite side portions, and a cavity extending into said jacket at least from said rear end of said jacket to a position near said front end of said jacket, said warhead being located in said cavity at a given position such that said front end of said warhead is near said front end of said jacket, said rear end of said warhead is near said rear end of said jacket and said upper and lower sides of said warhead are near said upper and lower sides of said jacket respectively, means for securing said jacket to said warhead when said warhead is located in said cavity in said given position, a tail section secured to said rear end of said jacket, said jacket being formed such that a main plan extending between said upper and lower portions of said jacket and between said front and rear ends of said jacket bisects said jacket into two sections, said surrounding wall of said jacket having two pointed seams on opposite sides of said main plane pointing outward from said main plane and which extend along the length of said jacket between said front and rear ends of said jacket, in each of a plurality of planes between said front and rear ends of said jacket and transverse to said main plain, said jacket has a maximum height and maximum width, in each of said plurality of planes, said two seams define the maximum width of said jacket.

12. The apparatus of claim 11, wherein:

said tail section comprises front and rear ends with a surrounding wall having an upper portion, a lower portion, two opposite side portions and a cavity extending into said tail section at least from said front end of said tail section to a position near said rear end of said tail section, said tail section being formed such that a main tail section plane extending between said upper and lower portions of said tail section between said front and rear ends of said tail section bisects said tail section into two sections, said surrounding wall of said tail section having two pointed seams on opposite sides of said main tail section plane and pointing outward from said main tail section plane and which extend along the length of said tail section between said front and rear ends of said tail section, in each of a plurality of tail section planes, between said front and rear ends of said tail section and transverse to said main tail section plane, said tail section surrounding wall has a maximum height and a maximum width, in each of said tail section planes, said two tail section seams define the maximum width of said tail section surrounding wall, said front end of said surrounding wall of said tail section is coupled to said rear end of said surrounding wall of said jacket such that said two pointed seams of said surrounding wall of said tail section at said front end of said surrounding wall of said tail section are aligned with said two pointed seams of said surrounding wall of said jacket at said rear end of said surrounding wall of said jacket.

13. The apparatus of claim 12, comprising:

fins connected to said surrounding wall of said tail section at positions below said two seams of said surrounding wall of said tail section and which extend outward to positions below said two seams of said surrounding wall of said tail section.

14. The apparatus of claim 6, wherein:

said front end of said rear member is adapted to be releasably secured to said rear end of said forward member with explosively actuated means such that said forward member may be released from said rear member during flight, said upper and lower ends of said forward member each having weakened portions extending along a given plane extending between front and rear ends of said forward member which may be split apart along said weakened portions, and explosive means for causing said forward member to split apart along said weakened portions.

* * * * *